Nov. 24, 1942.    L. W. LESSLER    2,303,215
CAMERA CONSTRUCTION
Filed Jan. 6, 1940    2 Sheets-Sheet 1

LEW W. LESSLER
INVENTOR.

BY
ATTORNEYS

Nov. 24, 1942.  L. W. LESSLER  2,303,215

CAMERA CONSTRUCTION

Filed Jan. 6, 1940  2 Sheets-Sheet 2

LEW W. LESSLER
INVENTOR.

BY
ATTORNEYS

Patented Nov. 24, 1942

2,303,215

UNITED STATES PATENT OFFICE 2,303,215

CAMERA CONSTRUCTION

Lew W. Lessler, Binghamton, N. Y., assignor to General Aniline & Film Corporation, Binghamton, N. Y., a corporation of Delaware Application January 6, 1940, Serial No. 312,735

6 Claims. (Cl. 95—40)

This invention relates to cameras and more particularly to cameras of the self-erecting front type.

While such cameras are well-known in the art, many forms of self-erecting front construction have been complicated in manufacture and operation and somewhat bulky in appearance. Also, these cameras were often inefficient in mechanical operation since the various combinations of erecting links used therein had very little leverage. In most cases separate levers or braces, connected with the casing, were employed to control the outward movement of the bed and the lens carrying member respectively, which required a more intricate form of construction.

With this prior art in view, it is accordingly one object of my invention to provide a camera of the self-erecting front type which will not be subject to these disadvantages.

An additional object is to provide such a camera in which a single link or swing brace is employed, pivoted at one end to the camera casing and at the other end to an extensible lens carrying member.

A further object is to provide such a camera in which the single link or swing brace may serve both to position the lens-carrying member and to assist in bracing the camera front in its open position.

A still further object is to provide such a camera in which the opening of the camera front and the erection of the lens-carrying member will take place automatically.

Another object is to provide separate spring means for opening the camera front and for moving the swing brace into position.

An additional object is to provide single locking means in such a construction for limiting the outward movement of the swing brace and for locking said camera front in its open position.

Further objects and advantages will appear from the following specification.

My invention accordingly comprises the construction and arrangement, a preferred form of which is shown in the accompanying drawings forming a part of this application, and in which Fig. 1 is a side view of a camera constructed according to one form of my invention;

Figure 1:
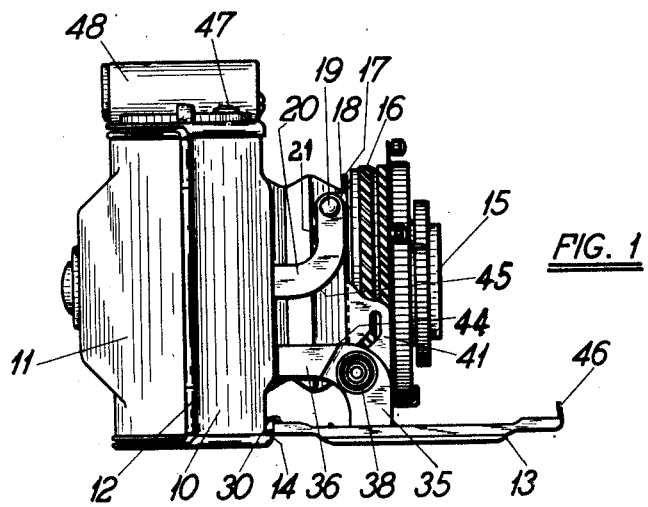

In order that those skilled in the art may fully understand the nature and scope of my invention and the various equivalent forms thereof, the following detailed and complete description is given with particular reference to the accompanying drawings, wherein like reference characters indicate like parts.

The camera casing or body 10 is provided with the camera back 11 hinged to the casing at 12 in known manner. A view finder 48 may be secured to the casing as shown. The camera front or bed 13 is hinged to the casing 10 at 14 and is adapted for movement between open and closed positions with respect to said casing. Suitable latching means (not shown) are provided to cooperate with tooth 46 on the camera front for holding the front in closed position. The latching means may be released by pressure on a button 47 on the casing.

The usual lens 15 and shutter casing and mechanism 16 (not shown in detail) are provided and may be mounted on a lens-carrying member or shutter plate 17, which in turn is supported in the following manner. At the top of the lens-carrying member 17 there is provided a backwardly projecting flange 18 which is pivoted at 19 to one end of a swing brace 20. One corner of the flange 18 may be bent to form a lug 21 which is so positioned as to limit the relative movement (counter-clockwise in the drawings) of lens-carrying member 17 with respect to the brace 20.

Figure 2:
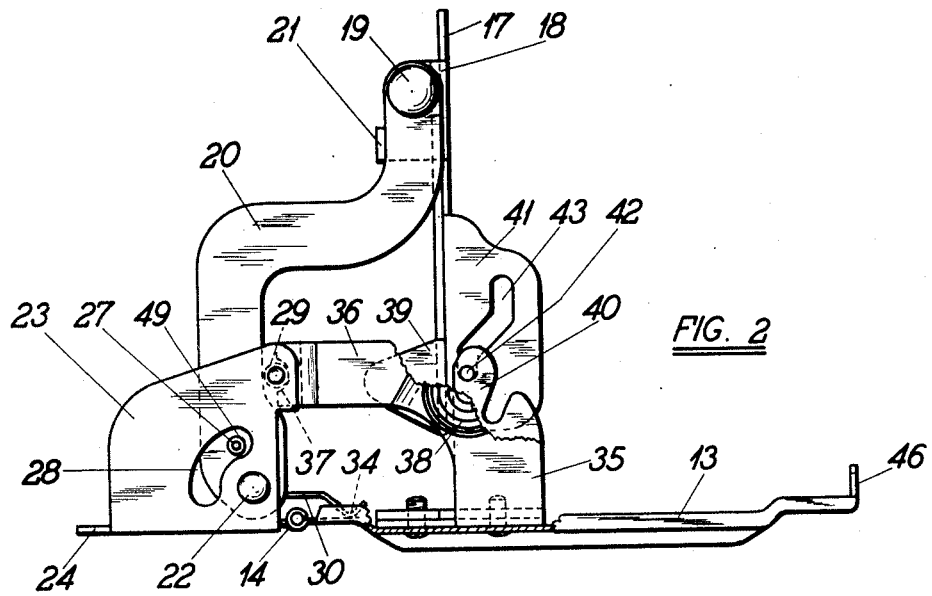
Fig. 2 is an enlarged side view (partially broken away) of the erecting mechanism shown in Fig. 1.

The other end of the swing brace 20 is pivoted to the camera casing at 22, this point of attachment being relatively close to the axis of rotation of the camera front hinge 14 (see Fig. 2). For the sake of convenience in construction, I have found that instead of pivoting this arm 20 directly to the casing itself it is very helpful to pivot it to the upwardly extending flange 23 of a rear platform member 24 as shown in the drawings. The bed or camera front 13 may also be hinged to this rear platform 24 as shown. This platform member and flange can then be fastened within the casing 10 adjacent the bottom and side walls thereof when the rest of the front mechanism has been assembled and adjusted. Obviously such platform member and flange are for mere convenience in assembly and their presence or absence does not alter the fact that the brace 20 is, in effect, pivoted directly to the casing itself.

In the preferred form of my invention I have found it desirable to include spring means 25 (Figs. 3 and 4) tending to urge the swing brace 20 to its outward position with respect to the casing. The particular spring means may be of the form shown and consists of a spiral spring, one end 26 of which rests against the rear platform member described above, and the other end 27 of which engages a hole or opening 49 in the swing brace 20. As a matter of convenience, the flange 23 may be provided with the cutout portion 28, which permits the end 27 of the spring 25 to extend through and beyond the swing brace 20 in order to insure complete engagement of these two parts.

The outward movement or rotation of the swing brace 20 is limited by the projection or stop 29 which for the sake of convenience may also be mounted on the flange 23.

In order to make the camera front 13 extend automatically to its open position, spring means 30 may be provided. These springs 30 (see Fig. 3) may be mounted on an axle 31 which in turn is positioned between two upstruck lugs or bearing members 32 on the rear platform 24. Thus one end 33 of each of these springs will bear against the rear platform while the other end 34 (see Fig. 2) will engage the front cover or platform and tend to force it to its open position.

To assist the spring means 30 in holding the front in its extended position, I have provided a latching member 35 on the camera front, which latching member has a rearwardly extending arm 36 provided with a notch or recess 37. This recess 37 is adapted to engage the projection or stop 29 above referred to, and thereby help prevent return movement of said camera front until said latching arm is released by pressure on the finger piece 38. It will be seen from the drawings that pressure on this finger piece will move the latching arm toward the center of the camera and out of engagement with the projections 29 to permit closing of the camera front 13 against the action of spring 30.

In order to limit the movement of said latching arm to an amount well within the elastic limits of the particular material employed, I have chosen to provide a side arm guard 39 attached to the lens-carrying member 17 and adapted to prevent excessive bending of said latching arm 35, 36.

The camera front 13 is further provided with a front bracket 40 which is adapted to assist in the positioning of lens carrying member 17. This member 17 is preferably provided with a forwardly extending flange 41 which is operatively connected to the front bracket 40 by reason of the pin 42 on said front bracket and the cam slot 43 in the flange 41.

The operation of this erecting front construction is as follows. With the camera front in closed position, operation of the button 47 will permit the front to be extended under the action of spring 30. At the same time, the swing brace 20 will move outwardly under the influence of its spring 25, and will carry the top of the lens-carrying member 17 outwardly to its operative position, this outward movement being limited by the stop 29. As the camera front 13 rotates to its open position, the pin 42 engaging the cam slot 43 will draw the lower portion of the lens-carrying member 17 to the desired operative position.

Since the outward movement of swing brace 20 is limited by stop 29, and since the outward or counter-clockwise rotation of the bottom portion of lens-carrying member 17 with respect to the swing brace 20 is limited by the lug 21 as previously described, it will be apparent that the camera front 13 will be limited in its outward movement to the position shown in the drawings. As the front reaches this outward position, the latching end 37 of the arm 36 will spring into engagement with the projection 29 and will hold the camera front rigidly in position until the operator desires to close the camera.

After the desired pictures have been taken, the operator simply presses the finger piece 38 on the latching arm 36, thereby disengaging the arm from the projection 29 and permitting the front to be closed against the action of spring 30. As the front is closed, the pin 42 on bracket 40 will move upwardly in the cam slot 43 and will tend to retract the lower portion of lens-carrying member 17 in proper relation to the casing.

Because of the action of the spring 25, however, the swing brace 20 will tend temporarily to remain extended and will maintain the top portion of lens-carrying member 17 in its outward position. To assist in the retraction of this spring brace 20, the latching arm 35, 36 has a further important function. As the camera front is closed, the portion 44 of arm 36 (see Fig. 1) moves toward the portion 45 of swing brace 20. When these two surfaces 44 and 45 come in contact at an intermediate position of the camera front 13, it will be apparent that furher closing of the front 13 will cause the retraction of swing brace 20 under the influence of surface 44. Thus the top portion of the lens-carrying member 17 will also be retracted and the camera front 13 may be latched once more in its closed position.

Figure 3:
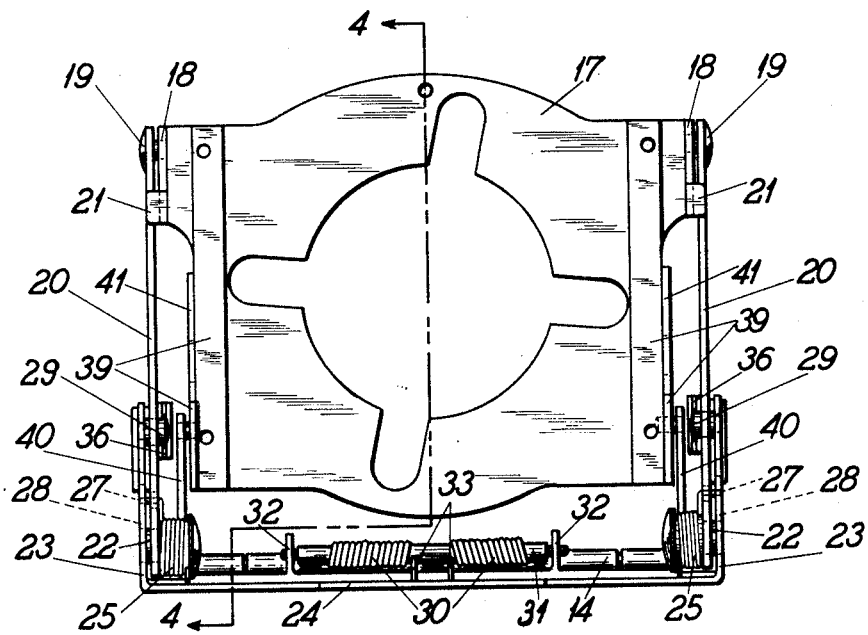
Fig. 3 is a view of the lens-carrying member and camera front mechanism from the rear, certain parts being omitted for the sake of clearness.
Figure 4:
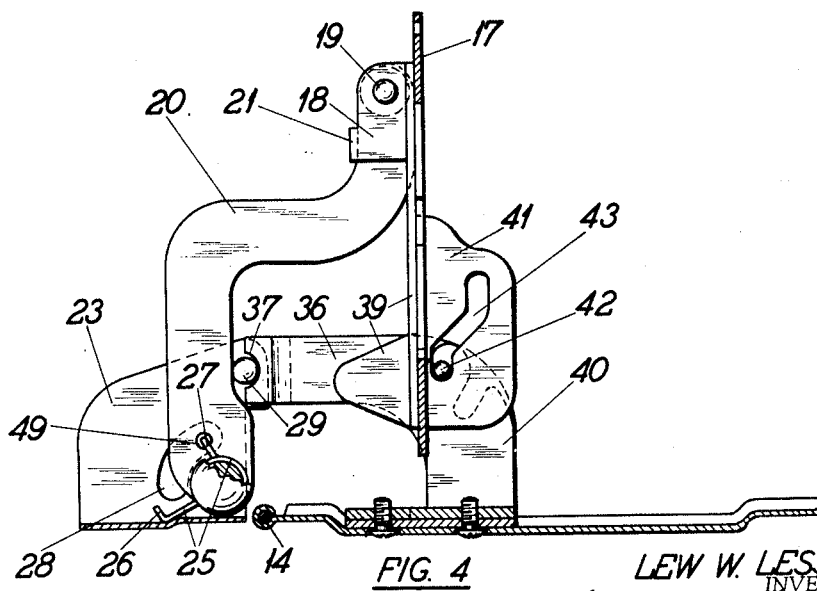
Fig. 4 is a detailed sectional view of the mechanism taken on the line 4—4 of Fig. 3.

While the foregoing description has been limited to a single erecting assembly, it is obvious, as shown in Fig. 3, that two such assemblies may conveniently be used, one at each side of the camera front and lens-carrying member.

In the foregoing description and drawings a new form of self-erecting front construction has been exemplified, which is compact and simple in operation and construction. When the release button 47 is operated, the camera front and lens-carrying member will be automatically extended to operative position and may be retracted again simply by pressure on finger pieces 38 and movement of camera front 13 to its closed position.

Since many embodiments of the precise inventive concept disclosed herein are possible, and since various equivalent forms of construction may be made, the invention herein is not to be limited to the specific form of construction shown in the specification and drawings, but is to be limited only by the prior art and the appended claims.

I claim:

1. A folding camera of the self-erecting front type having a casing, a camera front hinged to said casing for movement between open and closed positions with respect thereto, a lens-carrying member, a swing brace one end of which is pivoted to said casing near the hinge axis of said camera front and the other end of which is pivoted to an upper portion of said lens-carrying member for positioning said upper portion when the camera front is opened and closed, a bracket member rigidly fixed on said camera front, and interengaging means on said bracket and on a lower portion of said lens-carrying member for positioning said lower portion when the camera is opened and closed.

2. A folding camera of the self-erecting front type having a casing, a camera front hinged to said casing for movement between open and closed positions with respect thereto, spring means normally urging said front toward its open position, a lens-carrying member, a swing brace one end of which is pivoted to said casing near the hinge of said camera front and the other end of which is pivoted to a portion of said lens-carrying member more remote from said camera front for positioning said remote portion when the camera front is opened and closed, a bracket member rigidly fixed on said camera front and interengaging means on said bracket and on a portion of said lens-carrying member nearer said front for positioning said near portion when the camera front is opened and closed, means associated with said casing for limiting the outward movement of said swing brace and means limiting the relative rotation of said brace and said lens-carrying member whereby the open position of said lens-carrying member and said camera front is definitely determined.

3. A folding camera of the self-erecting front type having a casing, a camera front hinged to said casing for movement between open and closed positions with respect thereto, spring means normally urging said front toward its open position, a lens-carrying member, a swing brace one end of which is pivoted to said casing near the hinge of said camera front and the other end of which is pivoted to a portion of said lens-carrying member more remote from said camera front for positioning said remote portion when the camera front is opened and closed, a bracket member rigidly fixed on said camera front and interengaging means on said bracket and on a portion of said lens-carrying member nearer said front for positioning said near portion when the camera front is opened and closed, means associated with said casing for limiting the outward movement of said swing brace and means limiting the relative rotation of said brace and said lens-carrying member whereby the open position of said lens-carrying member and said camera front is definitely determined, and releasable interengaging means on said front and said casing for locking said front in its open position.

4. A folding camera of the self-erecting front type having a casing, a camera front hinged to said casing for movement between open and closed positions with respect thereto, spring means normally urging said front toward its open position, a lens-carrying member, a swing brace one end of which is pivoted to said casing near the hinge of said camera front and the other end of which is pivoted to a portion of said lens-carrying member more remote from said camera front for positioning said remote portion when the camera front is opened and closed, a bracket member rigidly fixed on said camera front and interengaging means on said bracket and on a portion of said lens-carrying member nearer said front for positioning said near portion when the camera front is opened and closed, means associated with said casing for limiting the outward movement of said swing brace and means limiting the relative rotation of said brace and said lens-carrying member whereby the open position of said lens-carrying member and said camera front is definitely determined, and a resilient latching arm on said front for releasably engaging said swing brace limiting means and locking said front in its open position.

5. A folding camera of the self-erecting front type having a casing, a camera front hinged to said casing for movement between open and closed positions with respect thereto, spring means normally urging said front toward its open position, a lens-carrying member, a swing brace one end of which is pivoted to said casing near the hinge of said camera front and the other end of which is pivoted to a portion of said lens-carrying member more remote from said camera front for positioning said remote portion when the camera front is opened and closed, a bracket member rigidly fixed on said camera front and interengaging means on said bracket and on a portion of said lens-carrying member nearer said front for positioning said near portion when the camera front is opened and closed, means associated with said casing for limiting the outward movement of said swing brace and means limiting the relative rotation of said brace and said lens-carrying member whereby the open position of said lens-carrying member and said camera front is definitely determined, a resilient latching arm on said front for releasably engaging said swing brace limiting means and locking said front in its open position, said latching arm being adapted to be sprung out of engagement with said brace limiting means by pressure on said arm, and means limiting the resilient movement of said arm to an amount within the elastic limit of the material from which the arm is made.

6. A folding camera of the self-erecting front type having a casing, a camera front hinged to said casing for movement between open and closed position with respect thereto, spring means normally urging said front toward its open position, a lens-carrying member, a swing brace one end of which is pivoted to said casing near the hinge of said camera front and to the other end of which is pivoted the upper portion of said lens-carrying member, additional spring means independently urging said brace toward its open position, a bracket member rigidly fixed on said camera front, slidable interengaging means connecting said bracket and a remaining portion of said lens-carrying member for positioning said member when said front is opened and closed, a latching arm on said front, and locking means on said casing releasably engageable by said arm for maintaining said front in its open position, said locking means also being engaged by said swinging brace to limit the outward movement of said brace, and said latching arm having a portion adapted to engage said swing brace and retract said brace and lens-carrying member against the action of said swing brace spring when said front is being closed against the action of said camera front spring.

LEW W. LESSLER.